INVENTORS.
ROBERT K. WILSON
EUGENE M. STONER
BY Thomas P. Mahoney
ATTORNEY.

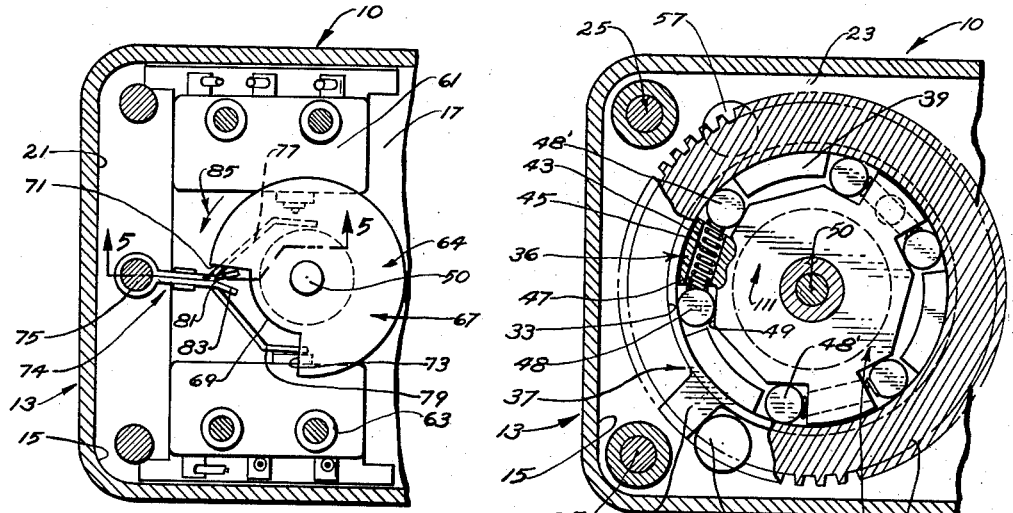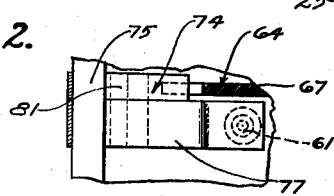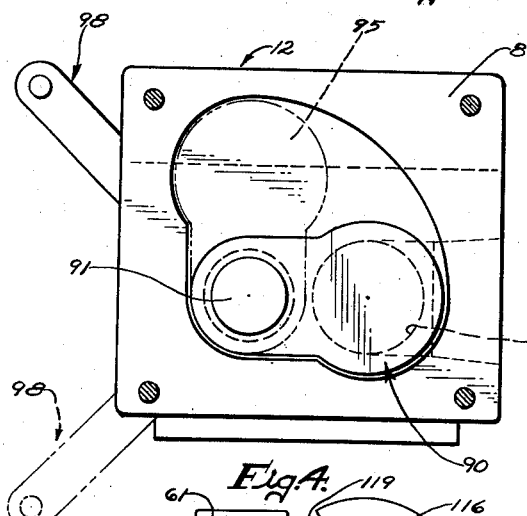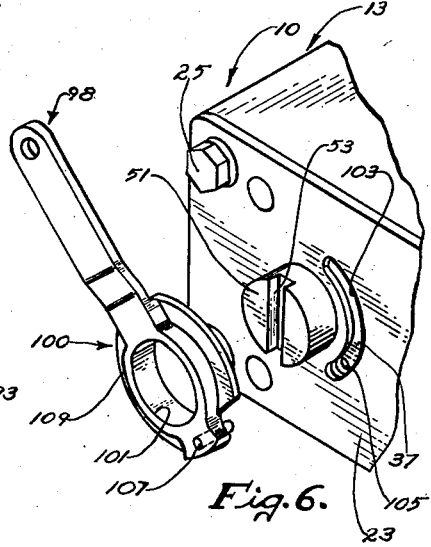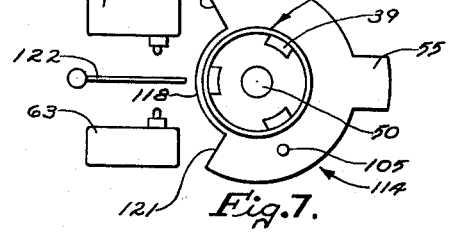
INVENTORS.
ROBERT K. WILSON
EUGENE M. STONER
BY Thomas P. Mahoney
ATTORNEY.

United States Patent Office 2,848,904
Patented Aug. 26, 1958

2,848,904

ELECTRICAL VALVE ACTUATOR

Robert K. Wilson and Eugene M. Stoner,
Los Angeles, Calif.

Application March 25, 1954, Serial No. 418,538

2 Claims. (Cl. 74—625)

This invention relates to an electrical actuator for driving a valve which is movable thereby between a plurality of positions. For purposes of convenience in the disclosure of the invention, the actuator is disclosed as utilized to cause the movement of a gate valve between open or closed positions, but it is, of course, not intended that the actuator of the invention be limited to the environment in which it is applied in the presently discussed application since it is obvious that the actuator could be utilized to cause the movement of different types of valves and other devices between a plurality of positions.

However, particular application for the actuator of our invention has been found in aircraft wherein it is necessary to remotely actuate valves in hydraulic lines to open or close said valves to control the flow of fluid through said lines. In the presently discussed embodiment of the actuator of our invention, an electric motor is utilized to drive the actuator and to cause the movement of the associated valve, electric motors being commonly used in prior art actuators as a source of power.

One of the major problems encountered in the utilization of prior art actuators has been the fact that it is frequently necessary to provide a manual over-ride to operate the valve should malfunctioning of the associated actuator occur. In conventional actuator structures, it is possible to disturb the relationship between the actuator and the valve by the mechanical over-ride of the actuator to such an extent that the valve will be improperly positioned by the actuator when the malfunctioning thereof ceases or the necessity for over-ride has passed.

Obviously, if the actuator is energized and the valve is not moved to a desired position, the hydraulic lines controlled by said valve will not be properly controlled and malfunctioning of the devices connected in said lines will result.

It is, therefore, an object of our invention to provide an actuator for a valve movable between a plurality of positions, said actuator incorporating an electric drive motor which is connectible to a drive shaft connected to said valve, over-ride means being provided for moving the valve to one of a plurality of positions without the necessity for energization of said electric motor, and means being provided on said drive shaft for insuring that the valve, the drive shaft, and the electric motor will not become unsynchronized with the resultant failure to move the valve completely to one of a plurality of positions when the over-ride action is completed and the motor energized once again.

Another object of our invention is the provision of an actuator of the aforementioned character wherein the electric motor is connected to the drive shaft through a clutch and the drive shaft has fixedly connected thereto means for automatically de-energizing said electric motor when the associated valve reaches one of its plurality of positions. The mounting of the de-energization means for the electric motor directly upon the drive shaft which is connected to the valve controlled through said drive shaft maintains the deenergization means and said valve in synchronism and eliminates the possibility that the motor may be deenergized prior to the valve's reaching one of its plurality of positions due to lack of synchronization between the valve and the means for de-energizing the motor.

A further object of our invention is the provision of an actuator of the aforementioned character in which a manual over-ride is associated with the actuator, said manual over-ride being connected to the drive shaft for moving the valve to one of its plurality of positions. An associated object of the invention is the provision of an actuator of the aforementioned character wherein the connection of the manual over-ride to the drive shaft is through the clutch which integrates the electric motor with said drive shaft.

A further object of our invention is the provision of an actuator of the aforementioned character wherein the clutch interposed between the electric motor and the drive shaft of the actuator is automatically disengaged when the valve driven by said actuator reaches one of its plurality of positions to break the connection between the drive shaft and the electric motor and prevent the burning out of said motor.

Another object of our invention is the provision of an actuator of the aforementioned character wherein the means for de-energization of the electric motor includes a movable member mounted on the actuator drive shaft for actuating switch means connected with said motor to cause the automatic de-energization thereof to prevent over-running of said motor.

In prior art actuator, valve combinations, it has been the custom to provide a valve and actuator combination in a single housing. Thus, failure of either component of the combination necessitates the complete removal and disassembly of both components from the housing.

It is an additional object of our invention to provide an actuator of the aforementioned character which is incorporated in its own housing and which may be readily dismounted from operative relationship with an associated valve should the failure of either the actuator or valve occur.

Another object of our invention is the provision of an actuator of the aforementioned character wherein the manual over-ride mans is disposed externally of the actuator housing, eliminating the possibility of entrance of contaminants into the actuator housing which occurs in conventional constructions wherein the manual over-ride means protrudes from the interior of the housing through an opening which permits the infiltration of contaminants thereinto.

Other objects and advantages of our invention will be apparent from the following specification and the accompanying drawings which are for the purpose of illustration only and in which:

Fig. 2 is a vertical, partly sectional view taken on the broken line 2—2 of Fig. 1;

Fig. 3 is a vertical sectional view taken on the broken line 3—3 of Fig. 1;

Fig. 4 is a vertical, partly sectional view taken on the broken line 4—4 of Fig. 1;

Fig. 5 is a vertical, partly sectional view taken on the broken line 5—5 of Fig. 2;

Fig. 6 is a fragmentary elevational view showing the mounting of the control handle for the manual over-ride of the actuator externally of the actuator housing; and Fig. 7 is a view of an alternative construction of the means for automatically de-energizing the electric motor of the actuator.

Figure 1:
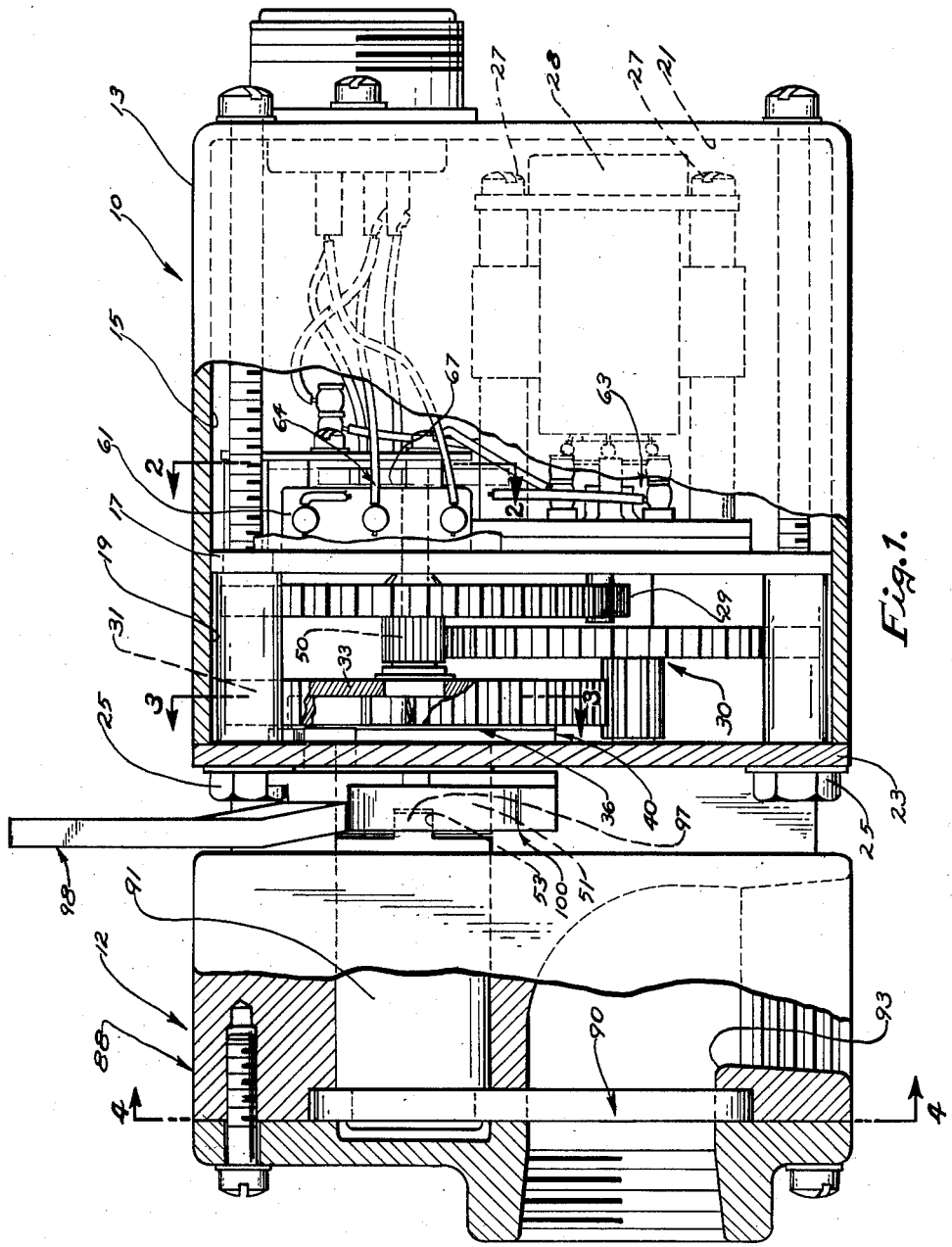
Fig. 1 is a partly sectional view of an actuator constructed in accordance with our invention and of a valve whose movement between a plurality of positions is controlled thereby.

Referring to the drawings, and particularly to Fig. 1 thereof, we show an actuator 10 constructed in accordance with our invention and associated in driving relationship with a valve 12. The actuator 10 is incorporated in a housing 13 which defines a chamber 15 for the reception of the component parts of said actuator. The chamber 15 is divided by a partition 17 into reduction gear and motor enclosures 19 and 21, respectively.

The open end of the housing 13 has a cover plate 23 secured thereto by means of bolts 25. Located in the motor enclosure 21 and mounted upon the partition 17 by means of mounting bolts 27 is an electric drive motor 28, said drive motor having a shaft extending through the partition 17 and mounting a pinion 29 located in the gear enclosure 19. The pinion 29 is connected in a reduction gear train, generally shown at 30, the last gear 31 of said train providing a housing 33 for a two-way over-running clutch 36, said clutch being constituted, in part, by a cage 37 having inwardly extending lugs 39 thereupon, Fig. 3, which control the energization and de-energization of said clutch.

The housing 33, on the periphery of which the gear 31 is formed, has the constituent elements of the two-way over-running clutch 36 disposed therein, as clearly shown in Figs. 1 and 3 of the drawings. The axially extending lugs 39 of the cage 37 extend inwardly into the housing 33, as shown in Fig. 3, and are rotatable with respect to the housing.

Disposed inwardly of the lugs 39 is a cam member 40, said member having a plurality of radiating projections 43 thereupon which are bored, as at 45, to receive compression springs 47. Disposed on opposite sides of the projections 43 are cam rollers 48 and 48' which are engageable with cam surfaces 49 on the cam member 40.

The cam member 40 is secured to the drive shaft 50 of the actuator and, when the clutch 36 is engaged, is caused to concomitantly rotate said drive shaft. The drive shaft 50 extends through the cover plate 23 and has a connecting member 51 mounted thereupon externally of said cover plate, said connecting member having a diametrical slot 53 therein to connect the drive shaft 50 with the valve 12.

Formed integrally with the cage 37 of the clutch 36 is a radially extending tang 55, said tang being movable with the cage between upper and lower stop pins 57 and 59, respectively. Therefore, when the rotation of the last gear 31 of the gear train 30 causes engagement of the clutch 36 to rotate the cam member 40 and the drive shaft 50 upon which said cam member is mounted, the tang 55 on the cage 37 will be concomitantly rotated to engage with one of the stop pins 57 or 59. Such engagement of the tang 55 with the stop pins disengages the clutch 36 to prevent further rotation of the drive shaft 50 by the reduction gear 31. The stop pins 57 and 59 are so located that they will de-energize the clutch 36 when the valve 12 has reached one of a plurality of its positions.

Mounted upon the partition 17 in the housing 13 are upper and lower limit switches 61 and 63, respectively, said limit switches serving to de-energize the electric motor 28 when the valve 12 has reached one of its plurality of positions simultaneously with the de-energization of the clutch 36. Such automatic de-energization of the motor 28 prevents said motor from running during the inactivation of the valve 12 and thus materially prolongs the life thereof. Mounted upon the end of the drive shaft 50, which extends through the partition 17, is a means 64 for automatically de-energizing the motor 28 by properly actuating either one of the limit switches 61 or 63.

The means 64 for de-energizing the motor 28 includes a rotatable disc 67, said disc being provided with a peripheral recess 69 whose upper and lower edges 71 and 73, respectively, are engageable with an actuating lever 74 pivotally mounted upon a pivot 75. The actuating lever 74 is of substantially Y-shaped configuration and includes upper nad lower arms 77 and 79 which are engageable, respectively, with the upper and lower limit switches 61 and 63. Disposed intermediate the intersection of the arms 77 and 79 are upper and lower contacts 81 and 83 engageable with the upper and lower edges 71 and 73 of the recess 69 in the rotatable disc 67.

It will be noted that, as best shown in Fig. 5 of the drawings, the arms 77 and 79 are displaced laterally with respect to the contacts 81 and 83. It is readily apparent, therefore, that if the drive shaft 50 is rotated by the electric motor 28, concomitant rotation of the means 64 for de-energizing said motor will occur. The engagement of the edges 71 and 73 of the recess 69 with the contacts 81 and 83, respectively, of the actuating lever is substantially synchronized with the movement of the valve 12 to one of its plurality of positions. Therefore, when the drive shaft 50 is rotated counterclockwise in the direction of the arrow 85 of Fig. 2, concomitant rotation of the disc 67 will occur causing the edge 71 to engage the contact 81 and depress the arm 79 to activate the switch 63 and de-energize the motor 28.

The integration and synchronization of the action of the means 64 for de-energizing the motor 28 and the valve movement is an important aspect of the invention since the possibility of lack of synchronization between the valve 12 and the motor 28 and, more particularly, the de-energization means 64 for said motor is eliminated, thus preventing the possibility that the motor 28 may be de-energized with the valve 12 between one of its plurality of positions. The rotation of the disc 67 in the opposite direction will, of course, disengage the edge 71 of the recess 69 from the contact 81, eliminating pressure on the limit switch 63 and closing the circuit to the motor 28 to permit the energization of the same.

The valve 12 is incorporated in a housing 88 and includes a rotatable valve member 90 mounted on a shaft 91 to move said valve member 90 between a first positions, Figs. 1 and 4, wherein said valve member obstructs a fluid passage 93 and a second position, as indicated by the dot-dash line 95 in Fig. 4, wherein the valve member 90 is withdrawn from operative relation with the fluid passage 93. The end of the shaft 91 protrudes from the side of the housing 88 and is provided with a tongue 97 engageable in the diametrical slot 53 in the connecting member 51 on the actuator drive shaft 50. Therefore, when the housings 13 and 88 of the actuator 10 and valve 12 are juxtaposed in operative relationship, th actuator drive shaft 50 is positively connected to the shaft 91 for rotating the valve member 90.

Mounted externally of the housing 13 of the actuator 10 is a manual over-ride handle 98, said handle constituting a portion of a manual over-ride means 100 and being provided with an annular bore 101 which permits it to be mounted about the periphery of the connecting member 51 on the drive shaft 50. Formed in the cover plate 23, Fig. 6, is an arcuate slot 103, said slot exposing a portion of the cage 37 of the clutch 36 which is provided with an opening 105 in the region of the slot 103 engageable by a pin 107 mounted in the handle 98. The handle 98 is provided with a radial flange 109 which overlies the major portion of the slot 103 in the cover plate 23 to prevent the infiltration of contaminants into the interior of the housing 13.

Therefore, when it is desired to manually over-ride the actuator 10, the handle 98 can be rotated in the appropriate direction about the connecting member 51 to move the pin 107 in the slot 103 and cause concomitant rotary movement of the cage 37. The external mounting of the handle 98 of the over-ride means 100 considerably reduces the possibility of infiltration of contaminants into the interior of the housing 13.

The mode of operation of the actuator 10 in causing movement of the valve 12 and, more particularly, the valve member 90 between its closed and open positions is as follows: Since it is necessary that the valve member 90 be disposed in either its closed or open position, the electric motor 28 will normally be in a state of de-energization as caused by the actuation of one of the limit switches 61 or 63. For instance, when the valve member 90 is in closed position, the means 64 for de-energizing said motor will have caused the previous actuation of the limit switch 63 by the action of the disc 67 and the actuating lever 74 included therein.

However, when the actuated limit switch 63 is overridden by the energization of the motor 28 from an appropriate source, such as the cockpit of an aircraft, the gear train 30 is energized to cause the rotation of the last gear 31 of said train. The motor 28 has a forward and reverse field so that when a switch, not shown, in the cockpit of the aircraft is energized in the appropriate direction, the field not de-energized by an actuated limit switch will be energized to cause the actuation of the motor 28. When such rotation of the gear 31 occurs in a clockwise direction, as seen in Fig. 3, the rollers 48', already wedged between the gear 31 and the cam member 40 by the springs 47, cause rotation of said cam member. Rotation of the cam member 40 will cause the simultaneous rotation of the drive shaft 50 which will, through the connecting member 51, rotate the valve shaft 91 to move the valve member 90 into its open position.

The rotation of the cage 37 will also cause the tang 55 on said cage to ultimately impinge on the upper stop pin 57 resulting in the retardation of the cage and the lugs 39 constituting a part thereof to drive the rollers 48 out of wedged relation with the cam member 40 and to release the cam member from operative relationship with the gear 31. Since the position of the stop pins 57 and 59 is determined by the disposition of the valve member 90 in its opened or closed positions, respectively, the tang 55 impinges on the pin 57 just as the valve member 90 reaches its opened position to release the drive shaft 50 from operative relationship with the motor 28 and prevent over-loading of the components of the actuator or the valve member 90.

During the rotation of the gear 31 to cause the movement of the valve member 90 to either one of its two positions, the clutch 36, disposed in the housing 33 having the gear 31 formed on its periphery, connects the inner wall of the housing 33 to the main drive shaft 50 by the wedging of the rollers 48 or 48' between the angularly oriented surfaces 49 on the cam member 40 and said inner wall. Thus, the gear 31 and the clutch elements, including the axially oriented lugs 39, rotate as a unit. It is only when the tang 50 on the cage 37 supporting the inwardly extending lugs 39 impinges on either of the stops 57 or 59 that relative movement between the lugs 39 and the inner wall of the housing 33 takes place so that the lugs 39 will displace the rollers 48 or 48' from locking engagement with the inner wall of the housing 33 to disconnect the gear 31 on the periphery of the housing 33 from operative relationship with the drive shaft 50.

Shortly before the release of the clutch 36 takes place in the above described manner, the rotation of the disc 67 of the motor de-energizing means 64 causes the edge 73 of the recess 69 in said disc to engage the lower contact member 83 to drive the upper arm 77 into engagement with the upper limit switch 61 and deenergize the motor. It will be noted that the movement of the drive shaft 50, the valve member 90, and the motor de-energizing means 64 is synchronized so that the position of the motor de-energizing means 64 actually reflects at all times the position of the valve member 90 in the valve housing 88. This is attributable to the direct connection of the motor de-energizing means 64 on the drive shaft 50.

When it is desired to manually over-ride the actuator 10, the actuator handle 98 is rotated in the appropriate direction, as indicated in Fig. 4 of the drawings. Such rotation of the handle 98 causes concomitant movement of the pin 107 associated therewith and said pin will, in turn, rotate the cage 37 of the clutch 36. Movement of the cage 37 will, of course, concomitantly move the lugs 39 of said cage to rotate the cam member 40 and the drive shaft 50 by impingement of the lugs 39 on the rollers 48. However, it will be noted that the movement of the cage 37 of the clutch 36 automatically releases the drive shaft from operative relationship with the gear train 30 and the electric motor 28 permitting free movement of the drive shaft 50 to cause the movement of the valve member 90 into either closed or open position. However, despite the fact that the drive shaft 50 is disconnected from the gear train 30 and the electric motor 28, there will be no loss in synchronization between the drive shaft 50, the valve member 90, and the motor de-energization means 64 since the positive connection of these elements will maintain them in synchronization.

The connection of the over-ride means 100 to the drive shaft 50 of the actuator by means of the clutch 36 is of importance in that it eliminates the drag customarily encountered in over-ride mechanisms wherein the over-ride takes place through the reduction gearing associated with the drive motor. In addition, the external mounting of the over-ride control handle and the provision of the cover flange 109 thereupon serves to prevent the infiltration of contaminants into the interior of the housing 13 of the actuator 10. In addition, the securement of the de-energization means 64 for the motor 28 directly to the drive shaft 50 eliminates the possibility of loss of synchronization between the valve and the motor which is an important advantage of the invention since it eliminates the possibility that the two elements will become unsynchronized, as frequently happens in conventional constructions wherein the automatic de-energization means for the driving motor operates through the reduction gearing or is operated directly from the motor.

Another embodiment of our invention is shown in Fig. 7 of the drawings wherein there is schematically disclosed an alternative means 114 for de-energizing the motor 28. The means 114 for de-energizing the motor 28 includes a clutch cage 116, said cage being provided with a tang 55 which functions in a manner identical with the tang 55 of the previously disclosed cage 37. The cage is also provided with lugs 39 which function to engage the rollers 48 of the clutch 36.

In the present embodiment of the invention, a peripheral recess 118 is formed to the cage 116, the opposite edges 119 and 121 of which are engageable with a lever arm 122 which controls the actuation of the limit switches 61 and 63. Therefore, when the cage 116 is rotated with the clutch 36 in which it is incorporated, it will simultaneously actuate the lever arm 122 when the tang 55 thereupon reaches one of its limits of movement. The provision of the means 114 for de-energizing the motor 28 in the clutch 36 itself provides for a somewhat simpler construction than that previously disclosed because it eliminates the necessity for the provision of the additional disc 67 on the drive shaft 50.

We thus provide by our invention an electrical actuator which is characterized by the fact that the device driven thereby is always maintained in synchronism with the means for de-energizing the motor of said actuator. Furthermore, manual over-ride means is provided in the actuator which materially simplifies the over-riding of the actuator by eliminating the necessity of operating through the gear train in the manner of customary constructions.

Another feature of the invention is the provision of the control for the over-riding means externally of the housing to eliminate the possibility of contamination of the interior of said housing. A salient feature of the invention is the provision of an actuator in a separate housing which is adapted to be operatively associated with the housing of the device which it is designed to energize, thus eliminating the necessity for dismounting both the actuator and the device actuated thereby should the failure of one of the elements occur.

Another advantage of interposing the clutch between the driven shaft and the gear train is that the gears will rotate freely after the clutch is thrown out, thus bringing new gear teeth into position for the next sequence of operation and evenly distributing the wear throughout the train.

The manual over-ride handle 98 can also be used in an interlock system whereby it is connected to another component of, let us say, an aircraft to prevent energization of the valve when the component is in a certain position by preventing rotation of the handle. The handle 98 will over-ride the actuator through the clutch and inadvertent energization of the actuator will not burn out the motor.

In high speed applications, the fact that the clutch is interposed between the gear train and the output shaft reduces the inertia on the shaft and the elements mounted thereupon, thus reducing shock loads when the motor is started and stopped.

We claim as our invention:

1. In an electrical actuator for a valve movable between a plurality of positions, the combination of: a housing having an opening in a wall thereof and an arcuate slot adjacent said opening; a valve drive shaft projecting through said opening; a motor in said housing connected to a reduction gear train; a bidirectional overrunning clutch operatively connected between the output of said gear train and said drive shaft; means for energizing and de-energizing said clutch mounted thereupon and juxtaposed to said slot; and a manual override mounted on said drive shaft exteriorly of said housing and operatively connected to said energizing means through said slot.

2. In an electrical actuator for a valve movable between a plurality of positions, the combination of: a housing having an opening in a wall thereof and an arcuate slot adjacent said opening; a valve drive shaft projecting through said opening; a motor in said housing connected to a reduction gear train; a bidirectional overrunning clutch operatively connected between the output of said gear train and said drive shaft; means for energizing and de-energizing said clutch mounted thereupon and juxtaposed to said slot; and a manual override mounted on said drive shaft exteriorly of said housing and operatively connected to said energizing means through said slot, said manual override being constituted by a handle freely rotatable on said drive shaft and said operative connection being constituted by a pin extending through said slot and engaging said energizing means.

References Cited in the file of this patent

UNITED STATES PATENTS

| | | |
|---|---|---|
| 2,324,571 | Fitz | July 20, 1943 |
| 2,523,825 | Hartley | Sept. 26, 1950 |
| 2,547,475 | Larson | Apr. 3, 1951 |
| 2,681,718 | Stoner | June 22, 1954 |
| 2,761,331 | Buescher | Sept. 4, 1956 |